US005682326A

United States Patent [19]
Klingler et al.

[11] Patent Number: 5,682,326
[45] Date of Patent: Oct. 28, 1997

[54] DESKTOP DIGITAL VIDEO PROCESSING SYSTEM

[75] Inventors: Joseph W. Klingler; Clifton L. Vaughan, both of Toledo, Ohio; Gregory M. Millar, Pleasanton, Calif.

[73] Assignee: Radius Inc., Sunnyvale, Calif.

[21] Appl. No.: 415,854

[22] Filed: Apr. 3, 1995

Related U.S. Application Data

[63] Continuation-in-part of Ser. No. 924,714, Aug. 3, 1992, Pat. No. 5,404,316.

[51] Int. Cl.$^6$ ............................................. G06K 15/00
[52] U.S. Cl. ............................................. 364/514 A
[58] Field of Search ............. 364/514 A; 348/563, 348/564, 578, 581, 584, 590, 588; 358/310, 311; 395/100, 161, 114, 116–118, 153–157, 159

[56] References Cited

U.S. PATENT DOCUMENTS

| | | | |
|---|---|---|---|
| 3,617,626 | 11/1971 | Bluth et al. | 358/311 |
| 4,538,188 | 8/1985 | Barker | 360/14.3 |
| 4,635,136 | 1/1987 | Ciampa et al. | 364/948.11 |
| 4,660,101 | 4/1987 | Martin | 358/342 |
| 4,675,755 | 6/1987 | Baumeister et al. | 348/26 |
| 4,685,003 | 8/1987 | Westland | 358/335 |
| 4,717,971 | 1/1988 | Sawyer | 358/311 |
| 4,729,044 | 3/1988 | Kiesel | 360/14.1 |
| 4,873,585 | 10/1989 | Blanton et al. | 358/335 |

(List continued on next page.)

OTHER PUBLICATIONS

Abode Premier product circular, printed Oct. 1991.
DiVa VideoShop product circular.
Digital Equipment Corp. Advanced Visualization System (AVS) User's Guide, May, 1992, cover page, and pp. 1–5, 1–6, 1–7, 1–8, 1–9, 1–10, 1–11 and 1–12.
Animation Production Environment (apE) Version 2.0 User's Manual, copyright 1990, Ohio State University, title page and pp. 8–9.
D. Ingalls et al. "Fabrik: a visual programming environment," in OOPSLA '88 Conf. Proc., pp. 176–190 (1988).
P.E. Haeberli, "ConMan: a visual programming language for interactive graphics," SIGGRAPH '88 Conf. Proc., Comput. Graph. 22(4) pp. 103–111 (1988).
M.P. Stovsky et al., "Building interprocess communication models using STILE," in Proc. Hawaii Int. Conf. Systems Sciences, vol. 2, 639–647, IEEE (1988).

*Primary Examiner*—Alpus H. Hsu
*Assistant Examiner*—Seema S. Rao
*Attorney, Agent, or Firm*—Brooks & Kushman P.C.

[57] ABSTRACT

A digital image processing system includes a microprocessor, random access memory, storage memory, input, display, and suitable logic to provide existing digital video image processing operations in a graphical user interface which allows the user to quickly and efficiently edit a movie. The system includes logic for displaying the assembled video and audio media, transitions, and special effects in a series of independent, time-correlated tracks which provide the system operator with a linear view of the movie as well as a quick understanding of the dataflow associated with the processing of the constituents of the movie at any point in time. In one embodiment, the system preserves the dataflow associated with processing a video clip by storing the information associated with that clip in a composite data file which includes not only the digital movie media in a conventional format, but also includes an additional data segment having the appropriate indices to any source clips and image processing effects, including the necessary timing and parameters for reproduction of the resultant clip. The system also preferably includes logic for creating, maintaining and displaying a separate render track which maintains the media corresponding to the portions of the program that have already been rendered in proper synchronization with those portions of the program that have been edited since the last rendering, thereby limiting any future rendering to those portions of the program which require reprocessing since the last rendering of the program of the movie.

4 Claims, 9 Drawing Sheets

U.S. PATENT DOCUMENTS

| | | | |
|---|---|---|---|
| 4,937,685 | 6/1990 | Barker | 360/14.1 |
| 4,939,594 | 7/1990 | Moxon | 360/14.1 |
| 4,943,866 | 7/1990 | Barker | 358/335 |
| 4,949,187 | 8/1990 | Cohen | 358/335 |
| 4,949,193 | 8/1990 | Kiesel | 360/14.1 |
| 4,964,004 | 10/1990 | Barker | 358/335 |
| 4,979,050 | 12/1990 | Westland | 360/14.1 |
| 5,012,334 | 4/1991 | Etra | 360/14.1 |
| 5,119,474 | 6/1992 | Beitel et al. | 395/154 |
| 5,175,622 | 12/1992 | Inoue et al. | 358/183 |
| 5,191,645 | 3/1993 | Carlucci et al. | 395/159 |
| 5,206,929 | 4/1993 | Langford et al. | 358/311 |
| 5,355,173 | 10/1994 | Fujita | 348/593 |
| 5,448,315 | 9/1995 | Soohoo | 348/722 |
| 5,521,841 | 5/1996 | Arman et al. | 364/514 A |

DESKTOP DIGITAL VIDEO PROCESSING SYSTEM

RELATED APPLICATION

This application is a continuation-in-part of application Ser. No. 924,714, U.S. Pat. No. 5,404,316, filed Aug. 3, 1992.

BACKGROUND ART

Editing videotape using conventional equipment and methods can be expensive and tedious. The process is essentially linear (i.e., modification of an earlier portion of a movie affects, and requires reprocessing, of the later portions of that movie), resulting in a restrictive editing environment which includes significant reprocessing of unedited media.

A number of digital video image processing and editing systems have been developed for use on desktop computer systems. Existing desktop digital video editing systems typically provide the capability for arranging digital movie clips in a desired sequence, and processing selected portions of these clips to, for example, provide transitions between clips or special effects, in order to produce a digital movie. These existing systems also typically include the capability of writing the finished digitized movie to another media, such as videotape. These systems may also employ various compression techniques to reduce the amount of digital data which defines a particular movie. However, even in a compressed format, significant processing time is required to implement transitions and special effects in the digital regime. Thus, the processing, and reprocessing, of the digital video image clips during editing can be time-consuming, particularly where the entire movie is reprocessed each time a portion of it has been edited. And, while existing digital video systems provide the video editor with a non-linear editing environment, the user interface of the systems is often cumbersome.

Also, in existing systems, once the arrangement, cutting, and editing of a movie has been completed, the digital media corresponding to all of the frames of the movie must be processed, or rendered. When the rendered media is generated, a complete digital video is created which can be played back on the appropriate available hardware. However, all of the information required to assemble the movie, such as the identification and location of the portions of the source clips utilized, the transitions and special effects, and the associated processing and timing information is lost, or stored in another unrelated project file.

The words "video" or "movie" as used herein are intended to refer to any electronic display of digital data sequences as images (and, optionally, sound). As used herein, video (or movie) media may include one or more "clips" each of which are subsets of the movie. Each clip is itself a movie comprising a sequence of one or more frames of images (and, optionally, sound). As used herein, a "program" is a meaningful sequence of clips, transitions, and special effects, assembled by an editor into a movie.

It should be noted that the words "desktop" or "personal" computer as used herein are intended to refer to any of the currently available general purpose single-user computers which may operate independently or network and may incorporate suitable software to perform other, non-video processing functions, such as word processing, graphics, database, and spreadsheet functions.

DISCLOSURE OF INVENTION

It is, therefore, an object of the present invention to create a digital image processing system which utilizes a general purpose desktop computer to quickly and easily edit movies in a non-linear environment.

It is another object of the present invention to provide a video digital image processing system including an interface which allows the user to assemble and edit a movie in an integrated multi-window environment which allows for quick access to source media, creation, organization, and quick recovery of movie clips, arrangement and assembly of selected clips, implementation and quick preview of desired transitions and special effects, and expeditious rendering of the finished movie.

It is another object of the present invention to provide a digital image processing system requiring minimal processing to render the digital media corresponding to a completed movie.

It is another object of the present invention to provide a data structure for storing digital movie media which can be stored and recovered to both play back the digital movie, and recover the necessary information required to reassemble the stored media from the source media from which it was created.

It is yet another object of the present invention to provide a digital video processing system which automatically records the processing operations selected to perform a particular video edit, so that variations in the editing process can be accomplished by recalling the original editing operations and reprocessing only those portions of the editing operations necessary to achieve a different desired result.

In carrying out the above and other objects, the digital image processing system of the present invention includes a processor, random access memory, storage memory, such as magnetic disk, input means, display means, and suitable logic to provide existing digital image processing operations in a graphical user interface which allows the user to edit a movie in the less restrictive non-linear digital image environment including multiple integrated windows which allow for quick and easy creation, organization, and assembly of clips into a movie.

The system of the present invention includes logic for displaying the assembled video and audio media, transitions, and special effects in a series of independent tracks, each correlated to a third parameter, such as a horizontal time line. The sequence of the clips, and the location and duration of transitions and special effects, as well as the associated audio tracks, can be correlated at a glance to a horizontal time line of the movie. Moreover, the vertical arrangement of the display of the independent tracks allows for quick understanding of the dataflow associated with the processing of the constituents of the movie at any point in time.

The system also includes logic for maintaining the media and special effects ("FX") tracks as independent data entities, which are synchronized (or correlated) to a common reference such as SMPTE codes, or other references to a common time line or frame number. It will be appreciated that the separation of the media clips from effects provides an additional control to the operator, including the ability to replace media without affecting the effect itself, the ability to control the pacing (overall time) of an effect independent of clip length or content, and the ability to save an effect and reapply it to another time segment.

The system of the present invention may also include suitable logic for creating dataflow graphs recording the image processing operations, and associated parameters and inputs selected using the interface, thereby allowing for easy modification of a previously designed set of processing operations and reprocessing of one or more selected video movie clips through recollection, alteration, and reprocessing of the stored dataflow graphs relating to the selected clips. In one embodiment, the present invention effectively preserves the dataflow associated with processing a selected clip by storing the information associated with that clip in a composite data file which includes not only the digital movie media in a conventional format, but also includes an additional data segment having the appropriate indices to any source clips and image processing effects, including the timing and parameters which produced the resultant clip, as well as suitable synchronization information for recreating the resultant clip.

The video image processing system of the present system also includes an interface capable of displaying one or more integrated movie-editing windows. One window displays some or all of selected clips of a movie-in-process, playing in real time along side a display of the source clips. Another window displays reference clips, either in a list or formatted as a two-dimensional array of clips with graphical identifiers which may be arranged in the array in a desired sequence for assembly into a movie. A third window is formatted to display the selected clips, transitions, and special effects as one or more horizontal tracks, independently identifying the video and audio media, as well as any image processing effects associated with the media, in a time line view to provide more precise display of those clips for frame-accurate editing. These windows, known as the Monitors, Project, and Sequencer Windows, respectively, together provide a complete composition and editing environment which allow the user to organize and process movie clips into a desired end product.

The Monitors Window is, in substantial part, two frame-sized sub-windows. One of the frame-sized sub-windows is a source monitor which displays the digitized source clips. The adjacent sub-window allows the user to view one or more selected clips that have been defined and/or processed using the editing system of the present invention. A Monitors Window includes standard controls to start and stop the movies in either of the sub-windows, as well as control the sound volume, and define in and out points to create reference clips.

In one embodiment of the invention, a second, external video monitor is utilized, preferably to display the Monitors Window, so that the source clips and selected reference clips can be viewed in the Monitors Window while the operator is simultaneously viewing and working in other system editing windows displayed on the primary computer monitor.

The Project Window preferably provides two alternate views of the reference clips collected for a particular movie project. In the Text View, the Project Window displays an alpha-numeric list of selected clips. In the Picture View, the Project Window displays some or all of the selected clips on an adjustable mxn array wherein each of the clips is identified by a selected image frame and, optionally a title bar.

The Sequencer Window provides a graphical time-line view of the selected video and audio media along with the associated processing effects applied to the media to yield the resultant movie. The Sequencer Window is particularly useful for assembling selected clips into a movie, since the linear view of the video and audio material and the display of the synchronization of the effects applied to that media, facilitate quick, detailed editing decisions. The output of any editing operations are synchronized with, and may be viewed on the Monitors Window.

The present invention also preferably includes logic for correlating each media track, such as for example the first video track, with any FX tracks associated with that media track. In one embodiment of the invention, the system correlates associated media and FX tracks with a common time-line in SMPTE time code units. It will thus be appreciated that not only does the system of the present invention provide a graphical correlation of each media track and its associated effects with run time (in the Sequencer Window), it also organizes the data associated with these entities in independent, but time-correlated files. Thus, a particular effect may be initiated during a selected time period (i.e., inserted in the appropriate FX track at selected SMPTE in and out points) independently of the affected video media. Conversely, a clip can be removed from the video track, and another inserted, without changing the effect applied during that time period.

The system also preferably includes logic for creating, maintaining and displaying a separate render track which maintains the media corresponding to the portion(s) of the program that have already been rendered in proper synchronization with those portions of the program that have been edited since the last rendering. By recording any edits to the program and determining the effect of those edits on any downstream (i.e., later-in-time) portions of the program, the render track automatically keeps track of those portions of the rendered program which must be re-rendered at any point in time. When the program is rendered, the system processes the source media referenced in all of the reference clips (i.e., all of the clips in the Sequencer Window tracks) utilizing the selected instructions for adding transitions and filters. Once rendered, a single media unit—a video program—is created for review or, if desired, for printing to videotape. The processing time associated with the application of special effects filters and transitions is significant. The render track, however, shortens this processing time, and thus speeds up the rendering of the movie, by re-rendering only those clips which have been edited, or which are affected by clips which have been edited, since the last rendering.

The present invention also preferably accomplishes many of the image processing techniques on multiple key frames of selected clips by progressively altering the frames of the designated clip on the basis of modified parameters interpolated (or extrapolated) from specified parameters for the key frames.

The present invention also provides a toolbox of digital image processing filters for movies which can be defined, combined, and previewed in a visual programming environment.

These and other objects, features, and advantages of the present invention are readily apparent from the following detailed description of the best mode for carrying out the invention, taken in connection with the accompanying drawings.

BEST MODE FOR CARRYING OUT THE INVENTION

Figure 1:
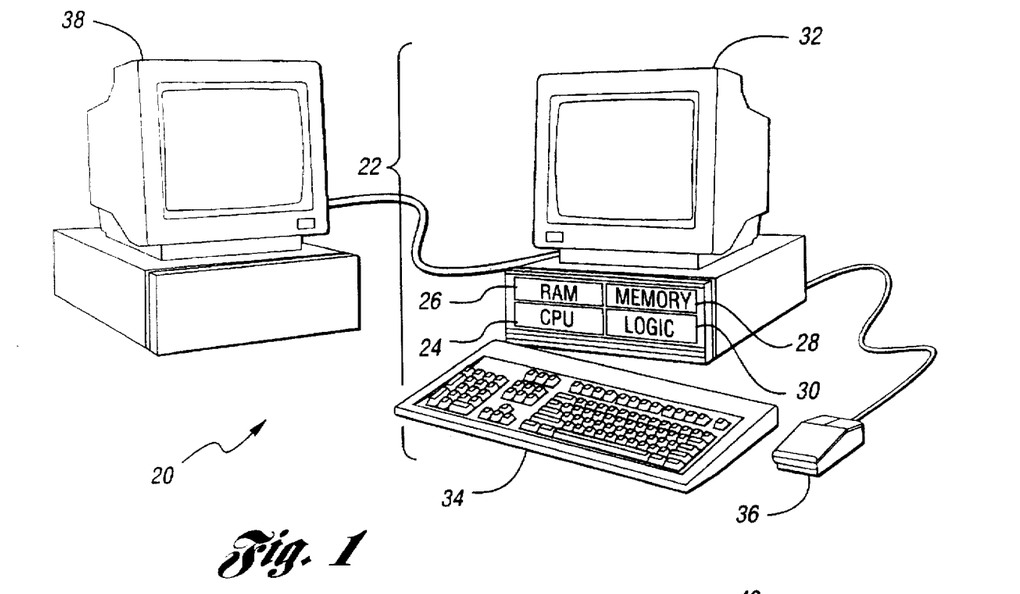
FIG. 1 is a schematic view of the system of the present invention.

Referring now to FIG. 1, the video image processing system of the present invention generally indicated as 20 includes a conventional desktop computer 22 including at least one processor 24, random access memory 26, storage memory 28, and suitable logic 30 to implement the image processing operations in the visual programming environment as hereinafter described. The system also includes at least one display 32, and one or more input devices such as a conventional keyboard 34 and/or mouse 36. The system also preferably includes a second display 38, such as an external television standard (e.g., NTSC) monitor.

In one embodiment, the system utilizes an Apple Macintosh series, having a Motorola 680X0 (68020, 68030, and 68040) series microprocessor, at least 32 megabytes of RAM, at least 200 megabytes of disk memory, a conventional keyboard with numeric keypad, and conventional mouse or roller ball. This embodiment of the system also employs Apple System 7.1 (or later) operating system, QuickTime 2.0, Macintosh Drag and Drop Manager, Apple Sound Manager 3.0 (or later), and QuickDraw GX 1.0 (or later) video software.

Other commercially available general purpose desktop computer hardware with similar color graphics capabilities and comparable digital video support software may also be utilized for this purpose.

Logic suitable for providing the image operations, file utilities, and the visual programming interface hereinafter described are preferably programmed in a Unix language such as "C" or "C++." Again, however, other similar general purpose programming languages may be utilized to implement the logic and interface described herein.

It will be appreciated that the system of the present invention can be implemented with features found in other image processing software systems, such as those illustrated and described in U.S. Pat. No. 5,404,316, which is hereby incorporated by reference for that purpose. In particular, the Sequencer Window with its independent, time-correlated media tracks, FX tracks, and rendering track, as well as the composite clip data file structure can be implemented in a variety of video image processing environments, such as that disclosed in U.S. Pat. No. 5,404,316, without departing from the spirit of the present invention.

Figure 2:
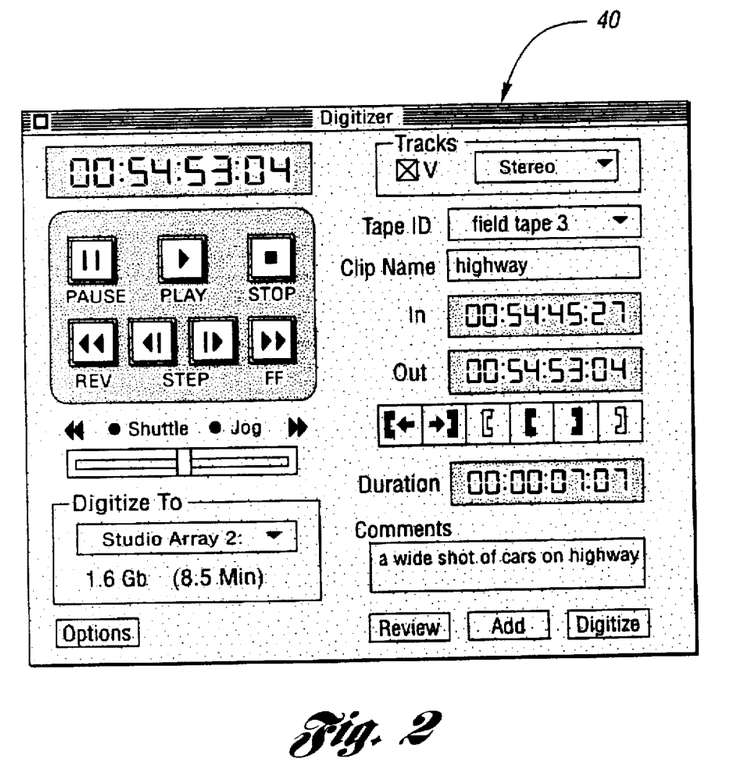
FIG. 2 illustrates a Digitizer Window.

It will also be appreciated that, in particular, the dataflow concepts, as described in FIGS. 2, 16 and 17, and the attendant specification of U.S. Pat. No. 5,404,316, may be incorporated into the system of the present invention, to provide an improved digital video movie editor. Again, the disclosure of U.S. Pat. No. 5,404,316 is also incorporated by reference herein to the extent that it pertains to these dataflow concepts.

Referring now to FIGS. 1–5, the display 32 (or, optionally, the displays 32 and 38) provide(s) a graphical user interface including a conventional menu bar from which any of a number of windows may be opened and utilized in editing a digital movie. As with other conventional Graphical User Interfaces (GUI's), the commands available under each of the menus may be displayed by keystroke command, or by positioning the arrow over the desired menu name and clicking to "pull down" the available commands. Again, as with conventional pull down menu interfaces, the commands are invoked by holding the mouse button down and positioning the arrow 66 down the menu until the desired command is highlighted, then releasing the mouse button. A desired command may also be invoked by striking the key combinations listed in the pull-down menu opposite the command. Consistent with conventional GUI's, the user may move from an active window to another window by positioning the cursor to the other window and "clicking" on it. Alternatively, the user may position the cursor on an icon associated with the desired window or action and "click" on the icon. Again, as with conventional GUI's, the user may double click on a file to load the data in the file or, if the file is a program, run the program. For example, the user may position the cursor over the clip displayed in the Monitors Window and double click to play that clip.

It should be noted that, in the embodiment of the invention which employs a second video monitor 38, each of the monitors 32 and 38 in the system are configured for a seamless mouse movement. For example, if the external monitor 38 is sitting to the left of the computer monitor 32 when in use, the system is configured so that, to move the mouse pointer from a point in the display of the computer monitor 32 to a position on the display of the external monitor 38, the operator may drag the mouse off the left side of the computer monitor screen to see it appear on the right edge of the external monitor. Again, this seamless integration of the mouse pointer with multiple monitors is achieved through the use of conventional monitor control software.

FIG. 2 illustrates a Digitizer Window which is used in one embodiment of the present invention. The Digitizer Window may be utilized to control an external video machine to capture and digitize the source video, as well as select in and out points to define the source clips. The clips are preferably defined by a clip identifier, the in and out points for the clip (preferably in SMPTE time codes), and any comments relating to that clip. Once defined, the source clips, either individually, or in groups, are then digitized.

It will be appreciated that, while the system 20 may provide a Digitizer Window or other external device control window as described above, other conventional techniques and equipment may be utilized to digitize and mark the source clips, which may then be edited as described herein on the system 20.

Figure 3:
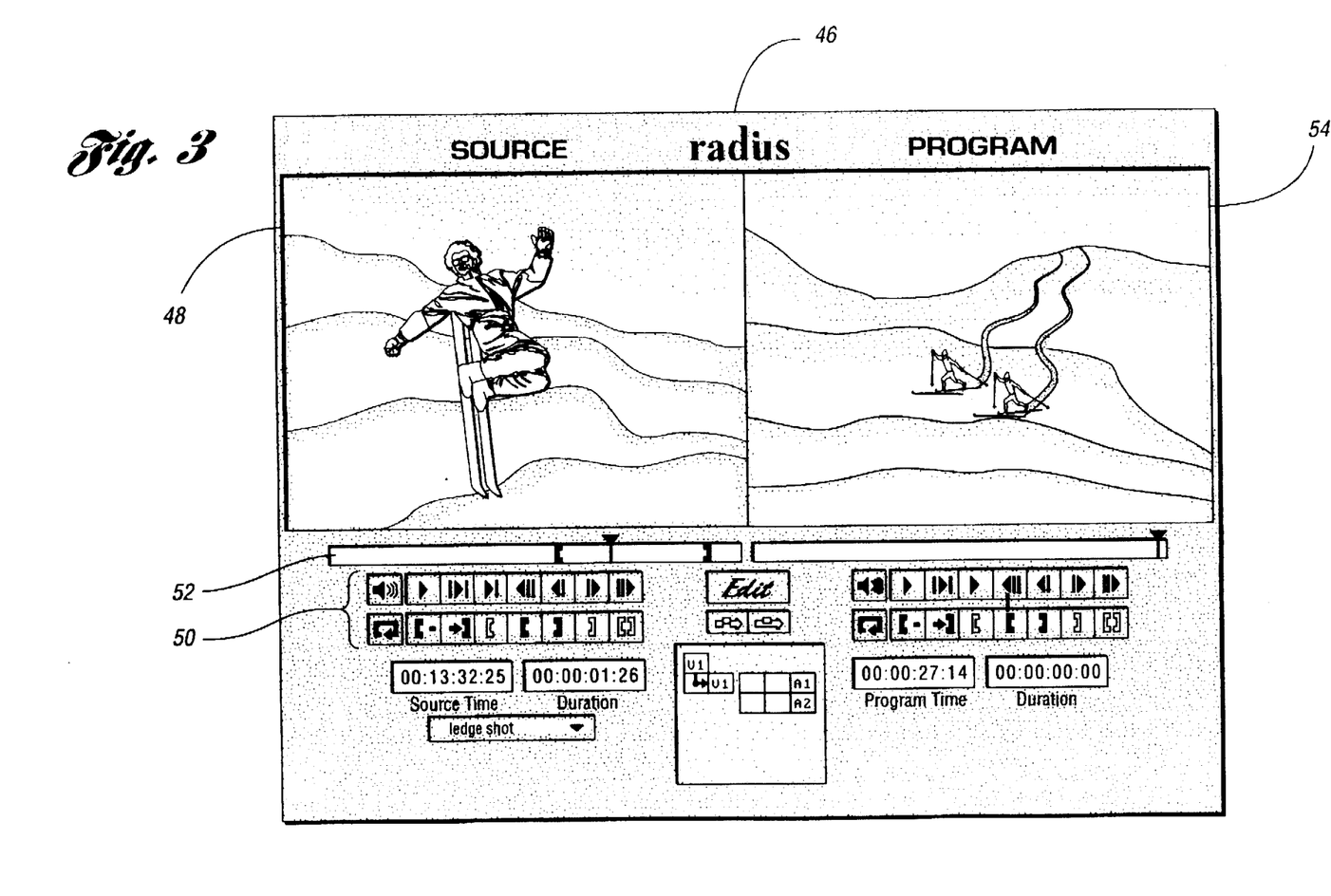
FIG. 3 illustrates a Monitors Window.

Referring to FIG. 3, after digitizing, the clips can be reviewed in the Monitors Window 46. In particular, the digitized source clips are displayed in the source monitor sub-window 48 of the Monitors Window 46. The Monitors Window 46 also includes graphical button controls 50 corresponding to conventional video players. Reference clips can be created from source clips by viewing selected portions of the source clips in the source monitor sub-window 48, selecting in and out points, and naming each of the reference clips. A slider bar or other suitable controls allow the user to define beginning and end points for reference clips. Thus, playing the source clips in the Source Monitors sub-window 48 allows the user to view exactly what has been digitized to disk (the source clips) as well as define reference clips to be utilized in assembling a program.

As with the other windows comprising the interface of the present invention, suitable conventional graphical buttons, slider bars, or other graphical switches or controls may be included in the windows to effect "point and click" activation of the functions within the windows. Alternatively, or in addition, pull-down menus, and/or selected keyboard commands may be implemented to provide the user with the ability to input information and/or control the various functions performed by the system.

Once the reference clips have been defined and collected, a program can be created using the editing system 20 of the present invention. A program is a meaningful sequence of reference clips created from the source clips. A reference clip does not contain the actual digitized media. Instead it contains references back to the media in the source clips, including in and out points (clip beginning frame and clip ending frame), for that reference clip. It should be noted that the reference clips defined and created for a particular program do not necessarily have the same in and out points as the source clips which contain the media referenced in the reference clips.

Figure 4:
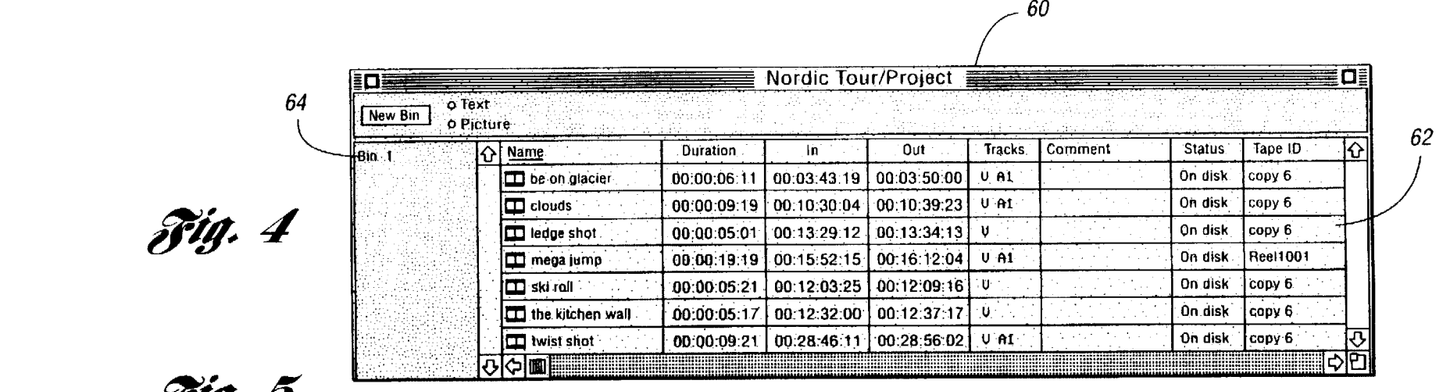
FIG. 4 illustrates a Project Window in Text View.

Once created, the reference clips for a particular movie project may be organized in the Project Window 60. As shown in FIG. 4, the Project Window may be displayed in Text View, resulting in the display of all of the clips in a particular project group or bin. In Text View, the Project Window 60 lists certain selected information about all of the clips in a particular bin in the clip sub-window 62. This information typically includes the clip name, clip duration, in and out points (typically in SMPTE time codes), the number and type of tracks comprising the clip, comments, status and tape I.D. The status of a clip typically indicates whether the clip is a reference to source media that is still on videotape, or to media that has been digitized and stored on disk. The clips are grouped in bins which are separately displayed in the bin sub-window 64 of the Project Window.

Figure 5:
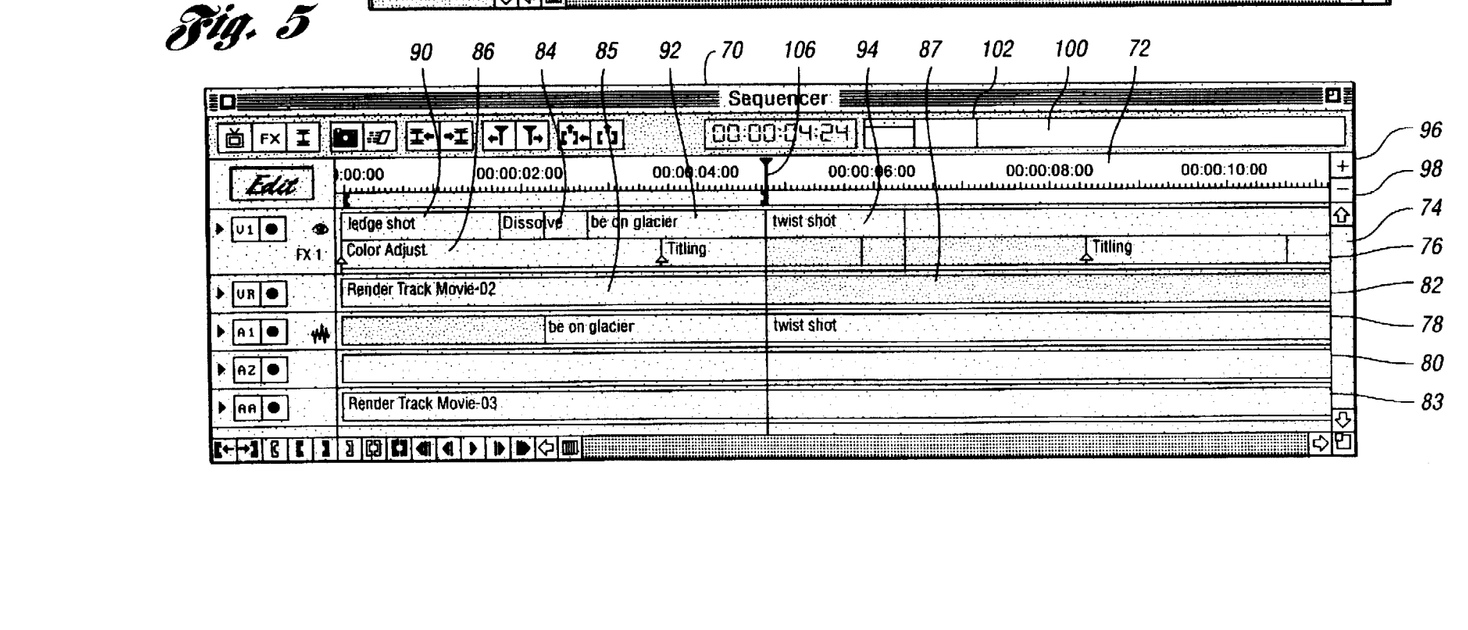
FIG. 5 illustrates a Sequencer Window.

Referring now to FIG. 5, the system 20 of the present invention includes a Sequencer Window 70 which provides a graphical representation of a time line 72 and multiple associated tracks 74-83, into which reference clips containing video and/or audio media, and processing functions, such as clip transitions 84 or special effects filters 86, can be arranged and correlated in time. A program, that is, a collection of reference clips, may then be assembled in the Sequencer Window 70 by opening the desired number of video, FX, and/or audio tracks, and arranging the media and/or effects in the desired sequence. As illustrated by the example in FIG. 3, a program can, for example, be created to include some portion or all of the "ledge shot" video clip 90 followed by the "be on glacier" clip 92 and thereafter followed by the "twist shot" clip 94. These clips can be dragged into the Sequencer Window 70, either from the Project Window 60 or from the Source Monitor sub-window 48 of the Monitors Window 46 by using conventional drag and drop techniques. The starting point and ending point of the reference clips can be changed, and/or the clips can be moved relative to other clips simply by clicking on and dragging the graphical representation of the clip in the sequencer time line.

The amount of detail seen in the time line window may also be varied by activating the zoom in and zoom out buttons 96 and 98 on the window. A Sky View sub-window 100 may also be provided. The Sky View sub-sub-window illustrates the entire program, preferably as color-coded tracks, and includes an indicator 102 which identifies the portion of the program that is currently visible in the Sequencer Window 70.

As the program is graphically assembled in the Sequencer Window 70, some portion or all of the program may be viewed in the program monitor sub-window 54 of the Monitors Window 46. The portion of the program to be viewed in the program monitor sub-window 54 may be selected by moving the time line cursor 106 over the desired starting frame of the clip. Alternatively, or additionally, the program monitor sub-window 54 may provide access to select any of the clips in the program assembled in the Sequencer Window 70 via a conventional pop-up menu which can be activated by pressing a program menu button (not shown) or other suitable keystroke command. When a clip is selected from the pop-up menu in the program monitor sub-window 54, the time line cursor 106 in the Sequencer Window 70 moves to the beginning of that clip. If the clip is not currently visible in the Sequencer Window 70, the view in the window changes to display the clip at the center of the window.

Referring again to FIG. 5, the system preferably provides a plurality of pre-defined special effects which may be applied to the selected clips as desired. In one embodiment, these effects are applied using conventional filters, including color adjust, fade, mirror, picture-in-picture, tint, and titling. The desired filter is selected from a pop-up menu which is accessed using conventional menu activation commands, and the filter is selected and dragged into an FX track 86 in the Sequencer Window. The parameters for controlling the operation of the filters may be set for selected key frames via a filter control window which, again, is activated by using conventional menu activation techniques.

The system 20 preferably allows the user to specify filter parameters for two or more key frames. The system then calculates the appropriate progressive values to allow the filter to gradually change the value set in one key frame to the values set in the next adjacent key frame so that the filter's affect on all of the frames between two adjacent key frames may be interpolated. It will be appreciated that by using multiple key frames, the system allows the user to change the rate of change effected by the filter over the length of the filter. It will also be appreciated that, while in one embodiment of the present invention the interpolation between key frames is linear, other non-linear, and/or discontinuous rates of interpolation can be implemented, using mathematical models or other data sources as modulators, to allow the user the capability of dynamically changing the effect of a filter without specifying individual filter parameters for each frame of the media affected by the filter. For example, a known "spline" (or smooth curve) may be utilized as a mathematical template for interpolation between key frames. Also, in place of interpolation, the system may provide a "hold" feature which identically modifies all of the frames subsequent to a key frame in an identical manner to that defined for that key frame, then abruptly changes the effect at the next key frame (and thereafter if appropriate) according to the parameter set for that key frame. Other templates may be utilized for interpolation including data from the media (both video and audio) itself.

Figures 6, 8:
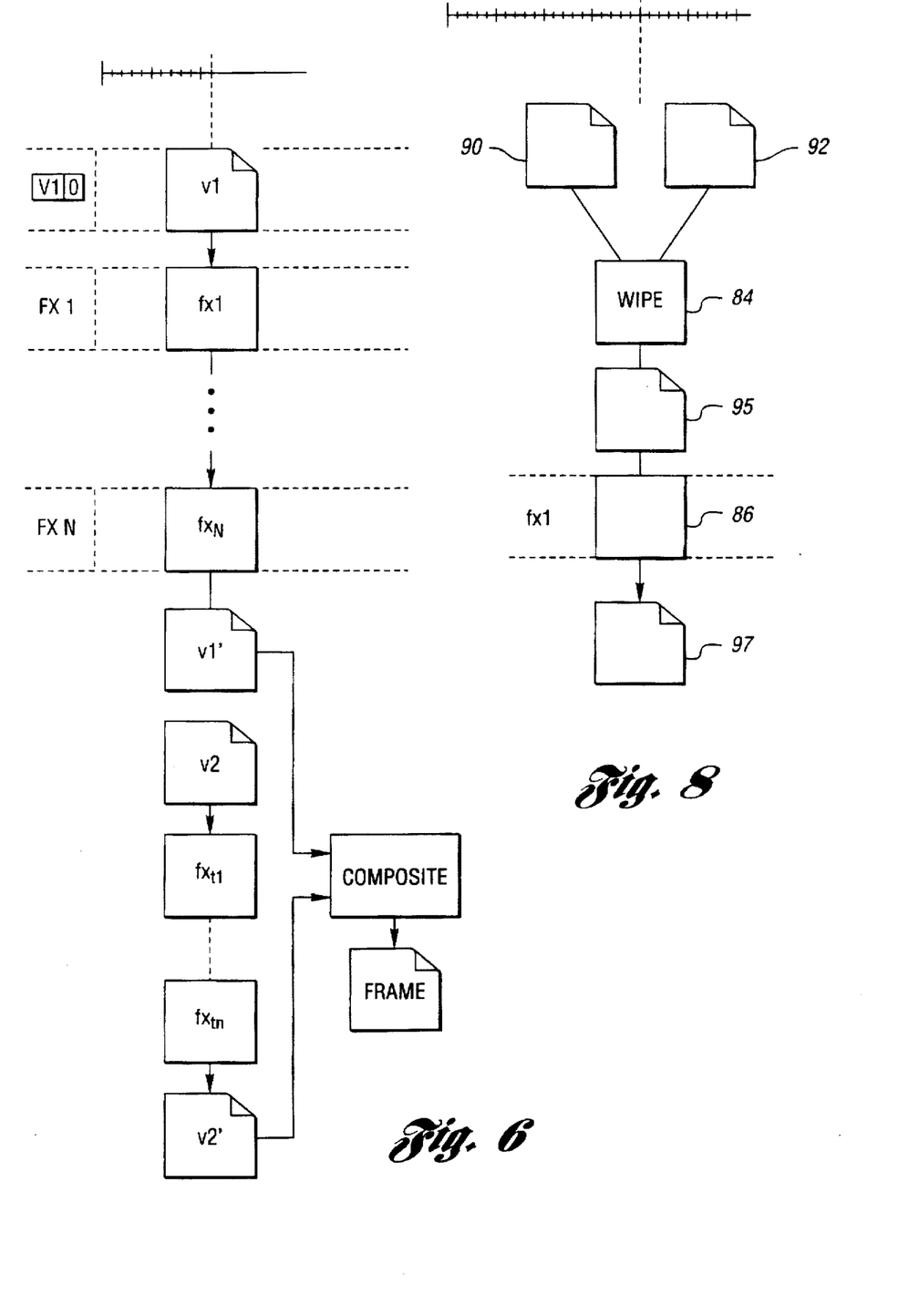
FIG. 6 illustrates a dataflow chart which may be derived from seeing the media and FX tracks in the Sequencer Window.
FIG. 8 is the dataflow diagram of a representative transition and a representative effect performed on selected frames of two adjoining clips.

In the example illustrated in FIGS. 5 and 6, a color adjust effect has been selected and placed on an FX track 86. The selected clips which are positioned in video track V1 during the time sequence covered by the color adjust filter will be processed through that filter. Thus, a special effect may be associated with a particular sequence in a video track through time correlation of the effect with the clips in that track. By utilizing a separate FX track, the effect is associated with a time sequence in the program rather than a particular clip or clips. Thus, for example, one or more of the clips may be removed and/or replaced with another clip by simply clicking and dragging the appropriate clip into position in the video track V1, and the preselected filter will act on whatever clip has been placed in the corresponding time sequence occupied by the filter in the FX track FX1.

Referring to FIG. 6, the graphical display of the Sequencer Window 70 indicates the dataflow of the media for each point in time (i.e., for each frame) of the program. By correlating the media and FX tracks with a selected point in time (or a selected frame), the user can glance along the time line cursor 106 in the video and FX tracks to ascertain what media is input through what effects filter or filters at each frame of the program. It should be noted that the system allows the user to add as many FX tracks as desired for any video track, so that each filter, as well as each media clip is independently displayed in vertically stacked tracks which are each synchronized with a horizontal time line.

It should also be noted that the system may allow for the creation, and editing, of multiple video tracks as well as multiple audio tracks. As shown in FIG. 6, a second video track, V2, as well as other multiple tracks are combined during rendering by utilizing conventional compositing (or layering) techniques. In one embodiment, for example, the system performs an alpha composite of each of the synchronized multiple video tracks of a program on a frame-by-frame basis during rendering. Other composite techniques could, of course, be utilized without departing from the spirit of the present invention.

It will be appreciated that the independent FX tracks is advantageous to the efficient operation of the system as well as being a useful graphical interface for the operator. By correlating the digitized media in with the one or more selected effects filters to a common parameter such as elapsed time or frame number, a system can process any time-synchronized, or otherwise correlated media and filters, regardless of whether the clips providing the media input at any selected point in time have been changed. Thus, in contrast to previous image processing regimes which associate a particular processing operation with particular selected media, the correlation of effects and media with a common parameter, such as time, allows for substitution of media or effects, with minimal restructuring of the processing.

Referring again to FIG. 5, in addition to creating and assembling reference clips into a program, the system of the present invention allows the user to implement a variety of transitions between the clips. The most common transition is a cut, which is an instantaneous switch from one clip to the next. A cut transition occurs whenever two clips are arranged adjacently in the Sequencer Window. The system also preferably includes several conventional transitions such as a cross-fade audio transition, a dissolve transition, an iris transition, a radial wipe transition, and a wipe transition. To employ any of these transitions, the desired transition is selected from a sub-window which is opened by clicking on the appropriate command from a conventional menu bar. The desired transition is then selected and dragged from the pop-up window to the junction point between the two clips for which the transition is desired. In one embodiment, the system displays the transition as a two-toned gold strip overlaying the clip junction.

In FIG. 5, a dissolve transition 84 has been placed between the "ledge shot" clip 90 and the adjacent "be on glacier" clip 92. The duration of the transition, as well as any other parameters associated with the transition, may be set by opening a transition dialog box using conventional menu activation techniques. In one embodiment of the present invention, the video track containing a transition may be expanded to graphically illustrate how the transition is positioned in relation to the clips it is used with. For example, as shown in FIG. 6, by activating toggle button 108, video track V1 is expanded vertically so that the "ledge shot" clip is shown positioned in a track above the dissolve transition, which in turn is positioned above the "be on glacier" clip. Each of the clips, as well as the transition, remain correlated with the time line 72 in the Sequencer Window 70. This expanded view may illustrate, for example, that one of the clips does not extend through the entire period of the transition. Thus, "ledge shot" ends before completion of the dissolve transition. This is illustrated by a shaded section 110, indicating an absence of media in the "ledge shot" clip for a portion of the dissolve transition. It will be appreciated that, since the system maintains the media tracks and transitions as independent entities, a desirable effect or transition, once created can be easily copied and moved to another location in the program. Thus, for example, the dissolve transition could be copied and moved to the junction between the "be on glacier" clip and the "twist shot" clip, without altering or affecting any of the media.

The system preferably provides several ways to view a transition before rendering the entire program. By clicking on the transition 84 on the time line in the Sequencer Window 70 and dragging the time line cursor 112 through the transition, a low quality, high-speed version of the transition is displayed in the FX monitor sub-window 120 (shown in FIG. 9) of the Monitors Window 46. By clicking on the transition 84 in the Sequencer Window 70 and activating another pre-selected command, an animation of the transition can be viewed. Finally, by moving the time line 106 to a selected frame in the transition 84 and activating another preselected command, a snap shot of one frame of the program, at that point in the transition, is displayed at final image quality. It will be appreciated that these various preview options allow the user to select an option that balances the conflicting considerations of minimizing processing time and maximizing image quality during the editing stage.

Figure 7:
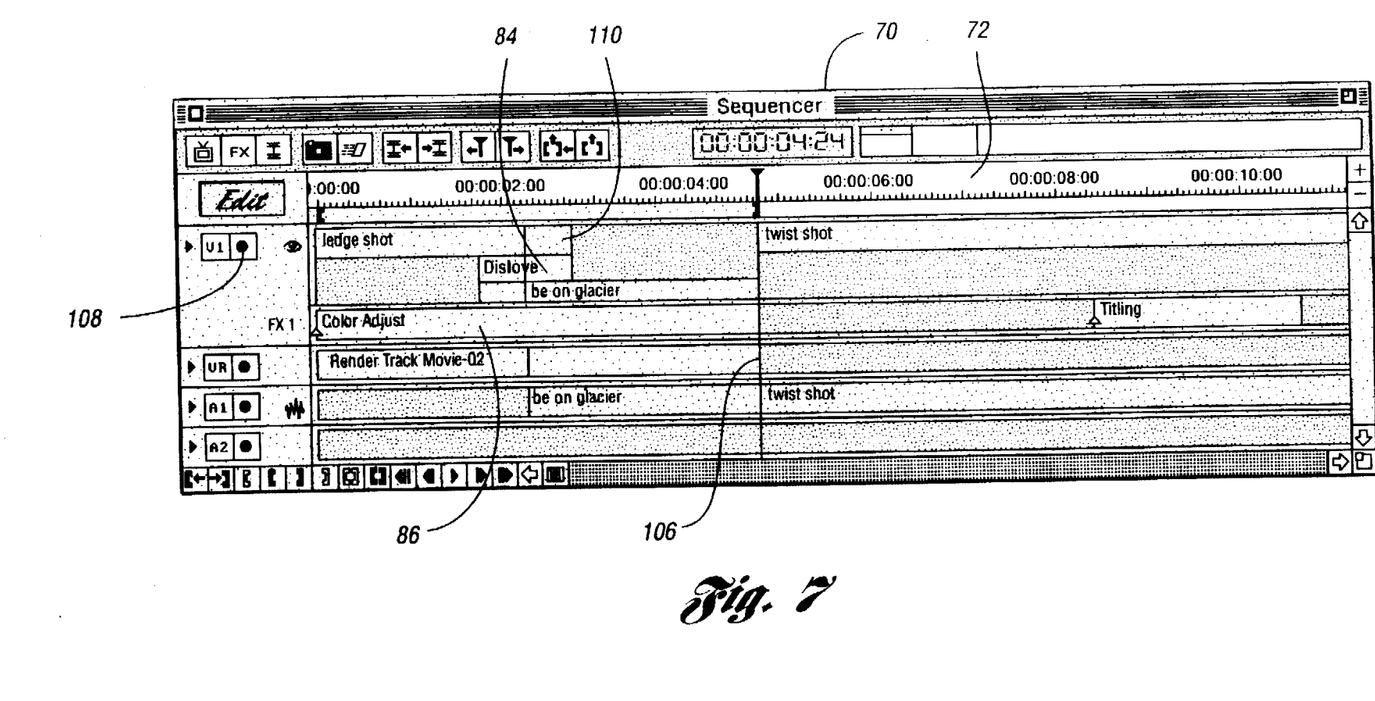
FIG. 7 illustrates a Sequencer Window with an expanded view of a transition between two clips.

Referring to FIG. 8, it will be appreciated by those skilled in the art of digital video image processing that the graphical display of the Sequencer Window 70 suggests a frame-by-frame dataflow for the program. For example, a transition (particularly when displayed in the expanded view shown in FIG. 7) graphically illustrates that at any point in time (i.e., at any single frame) there are video inputs (i.e., image frames) from two clips 90 and 92 which are processed as inputs through a transition filter 84 to yield a single output frame 95. And, in the example illustrated in FIGS. 5 and 6, at any selected point in time during the transition 84, the output frame 95 is then processed by a special effects filter 86 to yield a final frame in video track V1 at the selected point in time. The Sequencer Window 70 thus illustrates the concept of program linearity by correlating the individual media and FX tracks with a time line, while suggesting the dataflow of any image processing performed on the media at any selected point in time merely by glancing vertically down the time cursor line 106 in the window.

Figure 9:
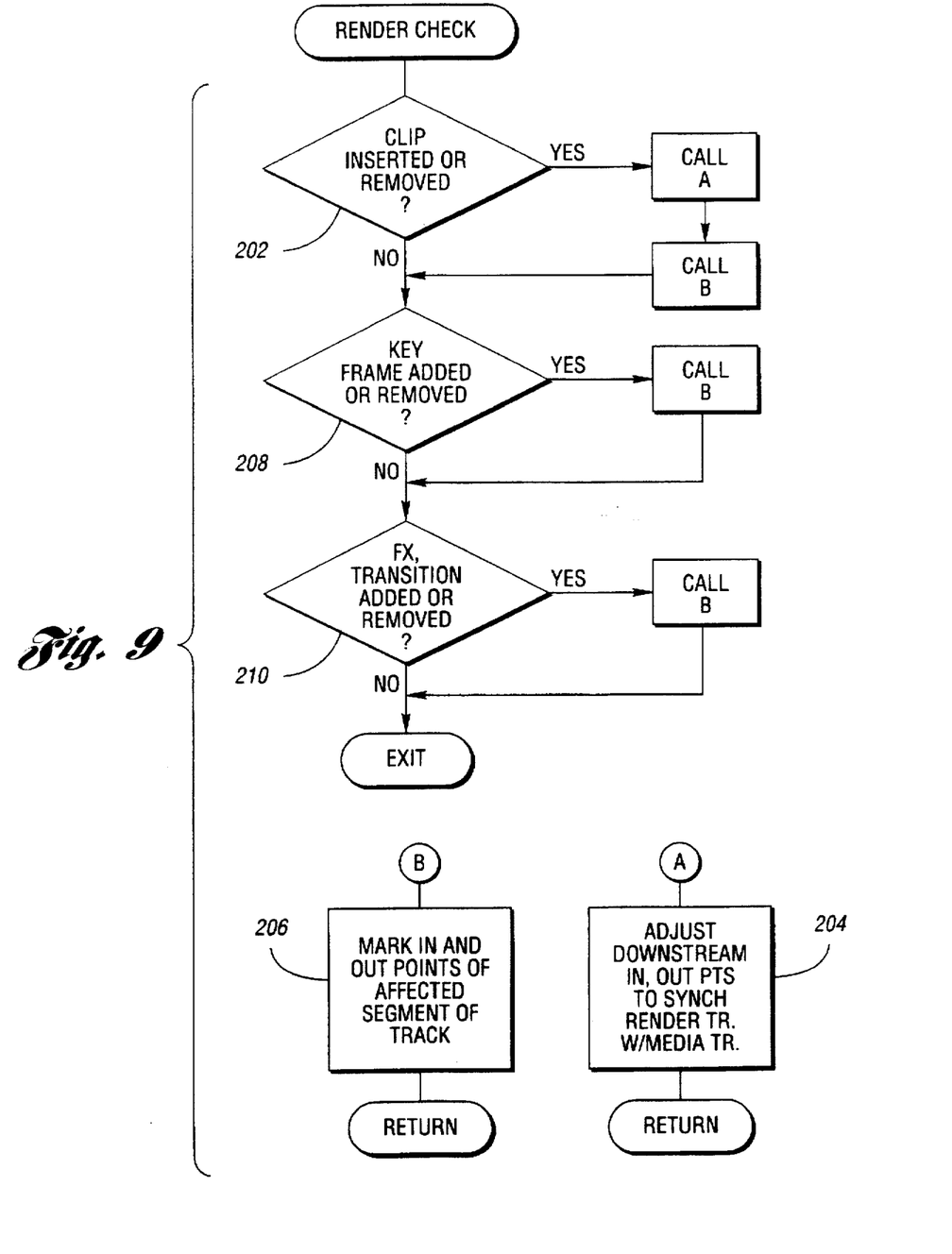
FIG. 9 is a flowchart illustrating the rendering logic employed in one embodiment of the invention.

Referring to FIGS. 5 and 9, the system 20 may employ, and display, separate render tracks 82, 83 corresponding to the media tracks in a program. When displayed, the render track 82 for a corresponding video track 74 graphically indicates, as, for example, by shading, those portions of the program which will require re-rendering, and those portions of the program which do not require re-rendering, since the last rendering. In the example shown in FIG. 5, that portion 85 of the render track 82 to the left of the time line cursor 106 is shown by relatively lighter shading to have already been rendered, while the portion 87 of the render track 82 to the right of the time line cursor 106 is shown, by relatively darker shading, to require rendering. By keeping track of what portions of the program media require rendering since the last edit, the system 20 limits time consuming reprocessing.

FIG. 9 illustrates a simple algorithm for determining what portions of a program require rendering. In a routine that is called periodically, such as an interrupt routine, the system 20 checks to determine whether any editing action has been taken by the operator. For example, the system checks, at 202 to determine whether a clip has been inserted or removed from a track. If, for example, a video clip has been inserted or removed, the system would then, at 204, adjust the downstream in and out points on the media on the affected track to correlate the downstream in and out points on the render track with the downstream media on the media track that has been repositioned as a result of the insertion or deletion of the clip. For example, if the "mega jump" clip (listed in the Project Window 60 in FIG. 4) is inserted in video track 1 before the "twist shot" clip, the in and out points of the "twist shot" clip and any downstream clips would be adjusted on both the video track 74 and the render track 82 by 19:19. The system 20 would then mark the in point of the "mega jump" clip (in this example, at the time line cursor 106 in the Sequencer Window 70 in FIG. 5) and the out point (19:19 frames later) of the render track to indicate that this segment must be re-rendered.

The system 20 similarly checks, at 208, to see if a key frame has been added or removed. If so, some portion of the clip, including frames before and after the added or removed key frame, will be marked, at 206, on the render track, to again indicate that that portion of the media must be re-rendered. It should be noted that the location and number of frames affected by a change in a key frame will be dependent upon the type of interpolation (i.e., linear, curvilinear, or discontinuous) employed.

The system 20 also checks, at 210, to determine whether any effects filters or transitions have been added or removed. If so, the system 20 marks the corresponding in and out points on the render track to indicate that re-rendering is required.

It will be appreciated that the system may allow for, and must therefore monitor, other operations which might modify the media on a particular track. Any such operations should be analyzed, the affected segments identified, and the appropriate in and out points marked for re-rendering on the render track.

In one embodiment, the system 20 allows the operator to manually mark portions of the render track 82 for re-rendering. Thus, for example, if a portion of segment 85 of render track 82 were so marked, the portions marked for re-rendering would then be displayed in the relatively darker shading (as in segment 87), indicating that the corresponding portions of the associated media tracks would be re-rendered on the next instruction to the system to render the program.

Figure 10:
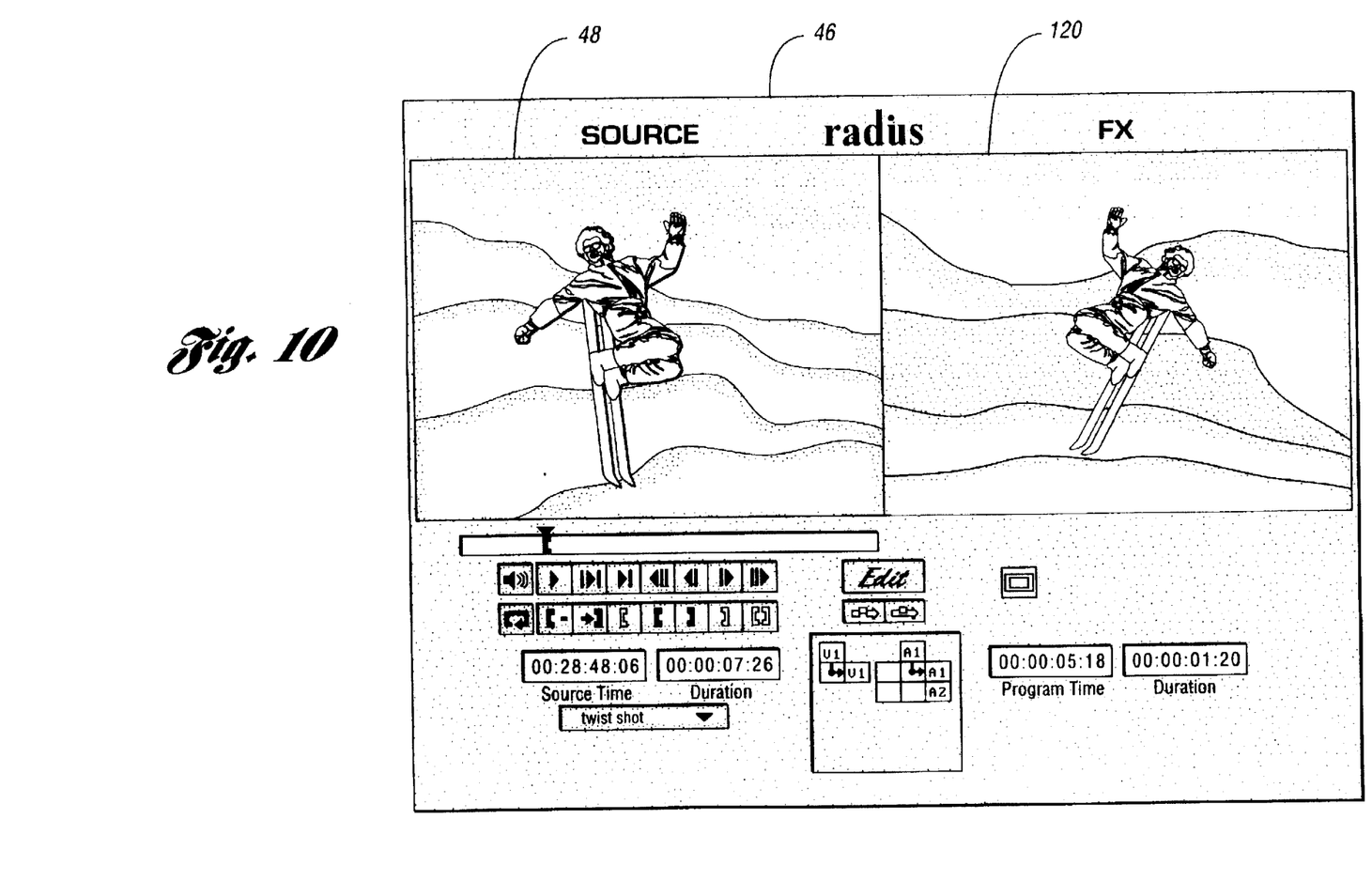
FIG. 10 illustrates the Monitors Window in FX View.

Referring to FIG. 10, the Monitors Window 46 may also present an FX View in which an FX monitor sub-window 120 is displayed adjacent the source monitor sub-window 48. As with previewing transitions, the operator can preview special effects created with filters in several ways. First, a high speed (i.e., relatively rapidly processed) version of a filter operation may be viewed at relatively lower video quality by clicking the filter on the time line in the Sequencer Window 70 and dragging the time line cursor through the filter. The results will be displayed in the FX monitor sub-window 120 of the Monitors Window 46. Similarly, the fully processed effect of a filter at final image quality may be viewed by clicking on the filter in the time line in the Sequencer Window 70 and pressing a preselected command (such as the Shift key) while dragging the time line cursor through the filter. Again, the results are displayed in the FX monitor sub-window 120. Another method of previewing the effect of a particular filter, reviewing an animation of the filter, can be accomplished by selecting the filter on the time line in the Sequencer Window 70 and clicking the animate button (or selecting some other predefined keystroke). Reviewing an animation of a filter's operation is particularly useful because it provides the operator with a view of how the filter works in "real time" with minimal processing, since the actual video media is not processed at each frame. This preview thus provides the operator with an opportunity to adjust the pacing of the filter before any rendering of the program.

Finally, a snap shot of any single selected frame of the program, including any special effects filters, may be viewed at final quality by moving the time line in the Sequencer Window 70 to the frame you want to see and clicking the snap shot button (or pressing some other preselected command).

Figure 11:
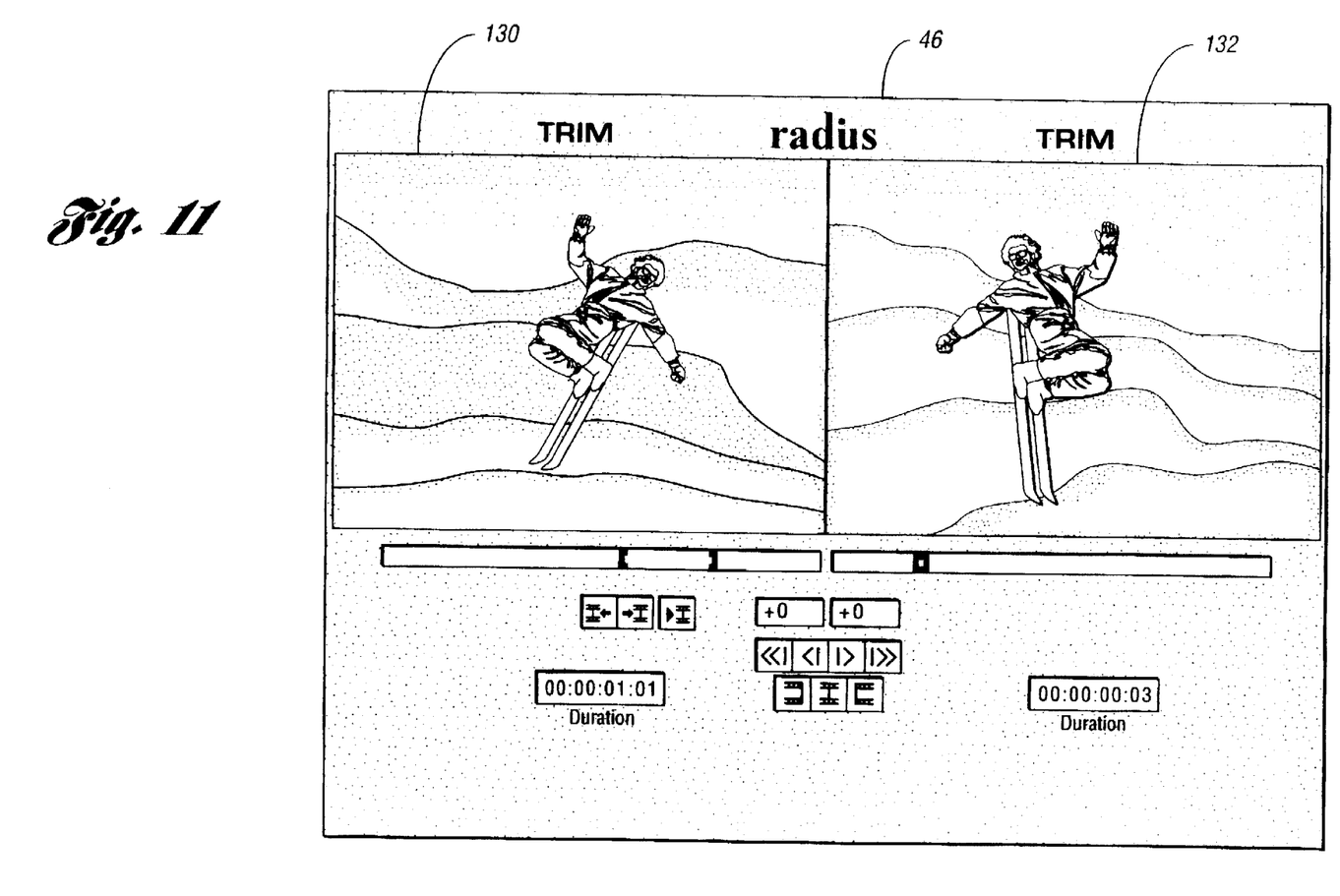
FIG. 11 illustrates the Monitors Window in Trim View.

Referring to FIG. 11, the Monitors Window 46 may also provide a Trim View which includes two Trim monitor sub-windows 130 and 132 for displaying selected portions of adjacent clips during roll editing. Roll editing lets the operator edit adjacent clips in a track—shortening one while simultaneously lengthening the other in order to maintain the constant length of the combined adjacent clips. The Trim View of the Monitors Window 46 may be activated by pressing a "Trim" button on the Monitors Window itself or by selecting the appropriate command from a pull-down menu, or by implementing a predefined keystroke on the keyboard. When activated, the selected adjacent clips are displayed in each of the Trim monitor sub-windows 130 and 132, with the selected end frame of the first of the two adjacent clips displayed in the left sub-window 130, and the selected first frame of the adjacent clips displayed in the right sub-window 132. By activating the appropriate buttons in the Monitors Window 46, the length of the first clip can be shortened and the second clip extended, or vice versa. Then by clicking the play button, or by activating a similar preselected command at the keyboard or on the menu bar, the adjacent clips can be played to view the roll edited transition.

Figure 12:
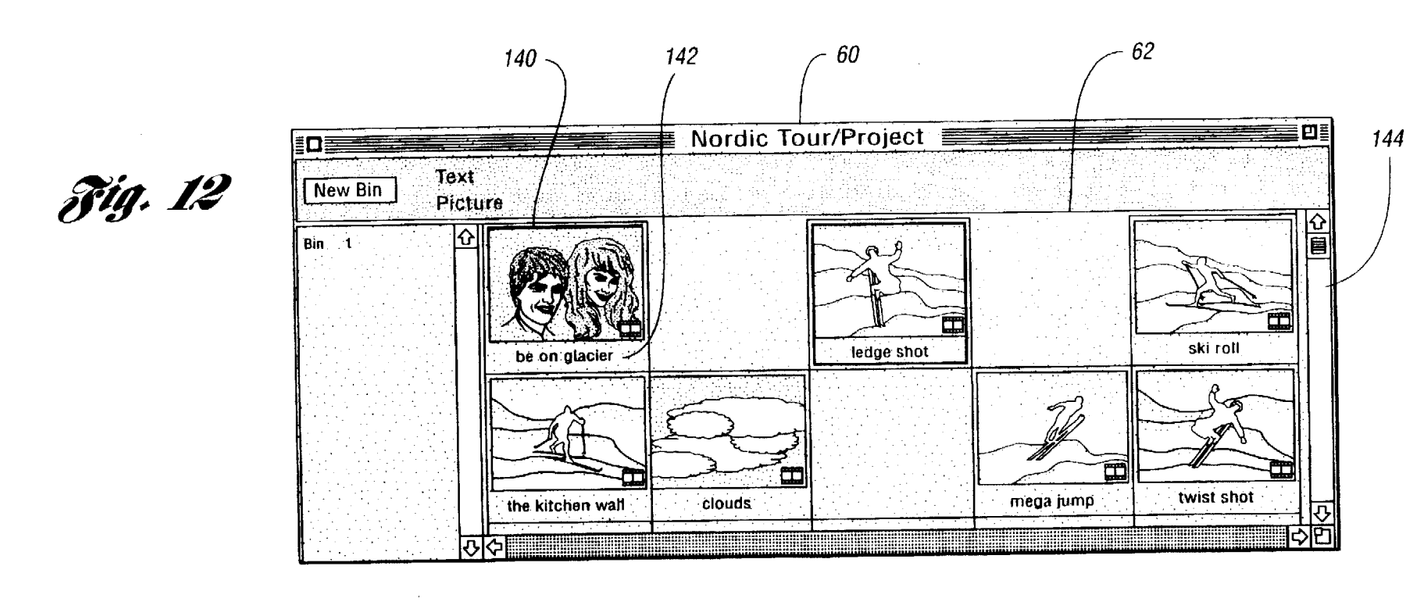
FIG. 12 illustrates the Project Window in Picture View.

Referring to FIG. 12, the system 20 of the present invention may also provide a Picture View of the Project Window 60 wherein the clip sub-window 62 displays a selected portion, or all of the clips located in a selected bin in an adjustable array of frame windows in which an image of a selected frame, such as the first frame, of each of the clips in the bin is displayed. The name of the clip may also be displayed on a title bar 142 associated with each clip window 140. The size of the clip sub-window 62 can be varied, preferably through the use of conventional slider bars 144 to size the clip sub-window 62 to display the desired number of clip windows 140 in a desired end-by-end array. The Picture View of the Project Window 60 may be utilized to order the clips in a desired sequence by clicking on and dragging the clips to empty blocks in the Picture View 62, in order to achieve a preliminary sequence of display of the clips for a program.

Figure 13:
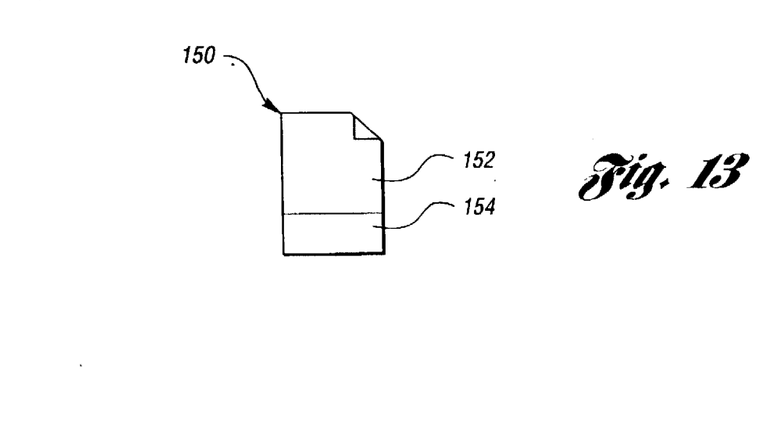
FIG. 13 is a schematic representation of a composite clip utilized by the system of the present invention.

Referring to FIG. 13, the system 20 of the present invention may include a composite clip data file structure for any rendered movies. The composite clip data file 150 includes a media segment 152 which contains the digital data corresponding to the rendered media in a conventional format. In one embodiment, for example, the media segment 152 of the composite clip data file could be in Apple QuickTime® format. The composite clip data file 150 also includes a composition data segment 154 which includes references to each of the source clips, references to any special effects and/or transitions, including established parameters and key frames, and the requisite timing information required to reassemble the media contained in the media segment 152 of the file. It will be appreciated that the existence of this composition information, properly stored directly with the media in a composite file structure, allows any systems that are capable of playing back the media to open the file and play the media, typically as a digital movie. For example, if the media portion of the file is in a QuickTime® format, anyone with a copy of the composite clip data file can play the digital movie contained in the media file portion 152 of the data file if they have a QuickTime® system. In addition, if the composite clip data file 150 is read by a system, such as the present invention, capable of accessing and interpreting the composition data segment 154 of the file, the system has access to the media required to play back the movie, as well as to all of the information that created the movie. This composite information thus allows the clip to be quickly edited and recreated by an appropriate system where the source material can be re-digitized or accessed from storage.

While the best mode for carrying out the invention has been described in detail, those familiar with the art to which this invention relates will recognize various alternative designs and embodiments for practicing the invention as disclosed by the following claims.

What is claimed is:

1. A digital movie processing system including a general purpose computer having:

a processor;

random access memory suitably connected to the processor;

storage memory operably connected to the processor;

an input connected to the processor; and a display operably connected to the processor, the display including a plurality of windows, each of the windows having a different format, and wherein one of the windows provides a graphical time-line view of one or more clips of the movie, including at least one horizontally extending media track in which graphical indicia of media clips can be inserted and correlated to an independent time line, and at least one special effects track in which graphical indicia of a special effect can be inserted and correlated with the time line.

2. A system for processing digital movies including a general purpose computer having, a processor, random access memory operably connected to the processor, a display operably connected to the processor, an input operably connected to the processor, and logic for correlating at least one media track containing at least one digital movie clip, and at least one FX track containing at least one special effect, with a common reference, thereby providing synchronization of the media track with the FX track to facilitate processing of the digital movie to obtain the special effect with the appropriate timing and parameters.

3. In a system for processing digital movies including a computer having a processor, random access memory, storage memory, and logic for performing selected image processing operations on the digital movie, improved logic for rendering the movie, the improved logic including:

(1) logic for identifying and marking digital information corresponding to those portions of the movie that have not been modified since the last time the movie was rendered, (2) logic for identifying and marking the digital data for those portions of the movie that have been modified since the last time the movie was rendered, and (3) logic for identifying and marking the digital data for those portions of the movie that have not been modified since the last rendering but are affected by portions of the movie that have been modified since the last rendering, and logic for rendering only the digital data marked in sections (2) and (3) in response to an instruction to render the movie.

4. In a system for processing digital movies including a computer having a processor, random access memory, storage memory, and logic for performing image processing operations on digital data corresponding to at least one movie clip, an improved composite clip data file comprising an image media segment and a composition data segment, the image media segment including digital data corresponding to the movie clip in a format suitable for playing the movie, and the composition data segment including data corresponding to the identity and location of the source media and image processing operations performed on the source media, including processing and timing parameters, suitable for reproducing the movie clip contained in the media segment of the data file from the source clips.

* * * * *